United States Patent
Chen et al.

(10) Patent No.: US 11,616,901 B2
(45) Date of Patent: Mar. 28, 2023

(54) ADAPTIVE LENS STEP CONTROL WITH MULTIPLE FILTERS FOR CAMERA FAST AUTO FOCUS

(71) Applicant: Advanced Micro Devices, Inc., Santa Clara, CA (US)

(72) Inventors: Yu-Huai Chen, Hsinchu (TW); Po-Min Wang, Hsinchu (TW)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/215,488

(22) Filed: Mar. 29, 2021

(65) Prior Publication Data

US 2022/0311945 A1    Sep. 29, 2022

(51) Int. Cl.
  *H04N 5/232*    (2006.01)
  *G02B 7/09*    (2021.01)
  *G02B 7/36*    (2021.01)

(52) U.S. Cl.
  CPC ......... *H04N 5/232123* (2018.08); *G02B 7/09* (2013.01); *G02B 7/36* (2013.01)

(58) Field of Classification Search
  CPC ....... H04N 5/232123; G02B 7/09; G02B 7/36
  See application file for complete search history.

(56) References Cited

U.S. PATENT DOCUMENTS

| | | | |
|---|---|---|---|
| 8,146,821 B2 | 4/2012 | Barkan et al. | |
| 8,508,652 B2 | 8/2013 | Albu et al. | |
| 9,756,234 B2 | 9/2017 | Krestyannikov | |
| 10,057,499 B1 | 8/2018 | Chen et al. | |
| 10,200,599 B1 | 2/2019 | Baldwin | |
| 2010/0188558 A1 | 7/2010 | Gamadia et al. | |
| 2012/0162495 A1* | 6/2012 | Ogawa | H04N 5/232123 348/E5.045 |

(Continued)

OTHER PUBLICATIONS

Remens et al., "System Implications of Implementing Auto-Exposure on Consumer Digital Cameras", Proceedings of SPIE—The International Society for Optical Engineering, Mar. 1999, 8 pages, Version 2.0, https://www.cis.rit.edu/~rlkpci/PDFs/ei99_Final.pdf. [Retrieved Jan. 19, 2021].

(Continued)

*Primary Examiner* — Mekonnen D Dagnew
(74) *Attorney, Agent, or Firm* — Kowert Hood Munyon Rankin and Goetzel PC; Rory D. Rankin

(57) ABSTRACT

An apparatus and method for efficiently determining a final camera lens position that captures a focused input image are described. An image signal processing system of a camera capable of performing automatic focus includes a camera lens, an image sensor, a focus engine, and a lens controller. Rather than generate a single contrast value based on digital signals corresponding to a single image, the focus engine uses at least two value generators to generate multiple contrast values. The value generators are bandpass filters with different bandwidths from one another. The focus engine uses the multiple contrast values, rather than from a single contrast value, to determine a search direction for finding a final lens position of the camera lens, when to use relatively large or coarse step sizes for updating the lens position, and when to use relatively small or fine step sizes for updating the lens position.

20 Claims, 10 Drawing Sheets

(56) References Cited

U.S. PATENT DOCUMENTS

| | | | |
|---|---|---|---|
| 2016/0021295 A1* | 1/2016 | Krestyannikov | H04N 5/232123 348/345 |
| 2016/0150152 A1 | 5/2016 | Nakamaru | |
| 2020/0077031 A1 | 3/2020 | Lee et al. | |
| 2020/0244895 A1 | 7/2020 | Guerin et al. | |

OTHER PUBLICATIONS

Shim et al., "Gradient-based Camera Exposure Control for Outdoor Mobile Platforms", IEEE Transactions on Circuits and Systems for Video Technology, Jun. 13, 2018, 14 pages, Version 3, https://arxiv.org/pdf/1708.07338.pdf. [Retrieved Jan. 19, 2021].

Shim et al., "Gradient-based Camera Exposure Control for Outdoor Mobile Platforms", 67 pages, https://drive.google.com/file/d/1XrqEn3DOF8_-KTDnVhxUknF0nQJ8QTiK/view. [Retrieved Jan. 19, 2021].

Wang, Po-Min, U.S. Appl. No. 17/215,552, entitled "Instant Auto Exposure Control With Multiple Cameras", filed Mar. 29, 2021, 40 pages.

Wang et al., U.S. Appl. No. 17/710,228, entitled "Object Distance Estimation With Camera Lens Focus Calibration", filed Mar. 31, 2022, 25 pages.

Chang et al., "Auto Focus Using Adaptive Step Size Search and Zoom Tracking Algorithm", Jan. 2005, 8 pages, https://www.csie.ntu.tw/~fuh/personal/AutoFocusUsingAdaptiveStepSizeSearchandZoom.pdf. [Retrieved Jan. 19, 2021].

Chiu et al., "An Efficient Auto Focus Method for Digital Still Camera Based on Focus Value Curve Prediction Model", Journal of Information Science and Engineering, Jul. 2010, pp. 1261-1272, vol. 26, No. 4, http://citeseerx.ist.psu.edu/viewdoc/downloaddoi=10.1.1.429.5381 rep=rep1 type=pdf. [Retrieved Jan. 19, 2021].

He et al., "Modified Fast Climbing Search Auto-Focus Algorithm with Adaptive Step Size Searching Technique for Digital Camera", IEEE Transactions on Consumer Electronics, May 2003, pp. 257-262, vol. 49, Issue 2.

Zhang et al., "Fast and accurate auto-focusing algorithm based on the combination of depth from focus and improved depth from defocus", Optic Express, Dec. 10, 2014, pp. 31237-31247, vol. 22, Issue 25, Optica Publishing Group.

* cited by examiner

ADAPTIVE LENS STEP CONTROL WITH MULTIPLE FILTERS FOR CAMERA FAST AUTO FOCUS

BACKGROUND

Description of the Relevant Art

Both still cameras and a video cameras capture optical images of a particular scene, and these images are converted into electrical signals such as digital data. For example, the camera includes an image sensor that captures the optical image and converts this information into analog electrical signals. An analog-to-digital converter (ADC) converts the analog electrical signals into digital electrical signals. The components of the camera are capable of editing the digital data, and storing the digital data. In various cases, the components encode, or compress, the digital data. In some cases, the stored digital data is uploaded to another computing system for data processing such as editing. Prior to performing these operations, the components of the camera attempt to capture a high quality image for the user.

Although in some cases, a user purposely performs over- or underexposure of a scene or creates blurring of a captured image for a particular effect, typically, users prefer a captured image of a scene with highly visible details. For example, the objects in the scene are easily discernible in the captured image when the digital data is rendered and presented on a display for viewing. One of the many factors that contribute to capturing a detailed and clear image is focus. A camera's "focus" refers to a particular lens displacement of multiple lens displacements of the camera that provides an optical image of a particular scene with the smallest amount of blur. In other words, the particular lens displacement provides an optical image of the particular scene with the highest amount of contrast, or the sharpest image. The lens displacement is measured between the camera lens and the image sensor of the camera. Rather than rely on the user to determine the particular lens displacement, many cameras provide an automatic method implemented by hardware for finding the particular lens displacement. This automatic method is referred to as "auto focus." The auto focus methods of cameras have a trade-off between focus speed and smoothness. Aggressive auto focus methods provide higher speed, but with a cost of little smoothness that provides discomforting preview images to the user. On the other hand, conservative auto focus methods provide high smoothness that is pleasing to the user glancing at preview images, but with a cost of low speed.

In view of the above, methods and mechanisms for efficiently determining a final camera lens position that captures a focused input image are desired.

Figure 1:
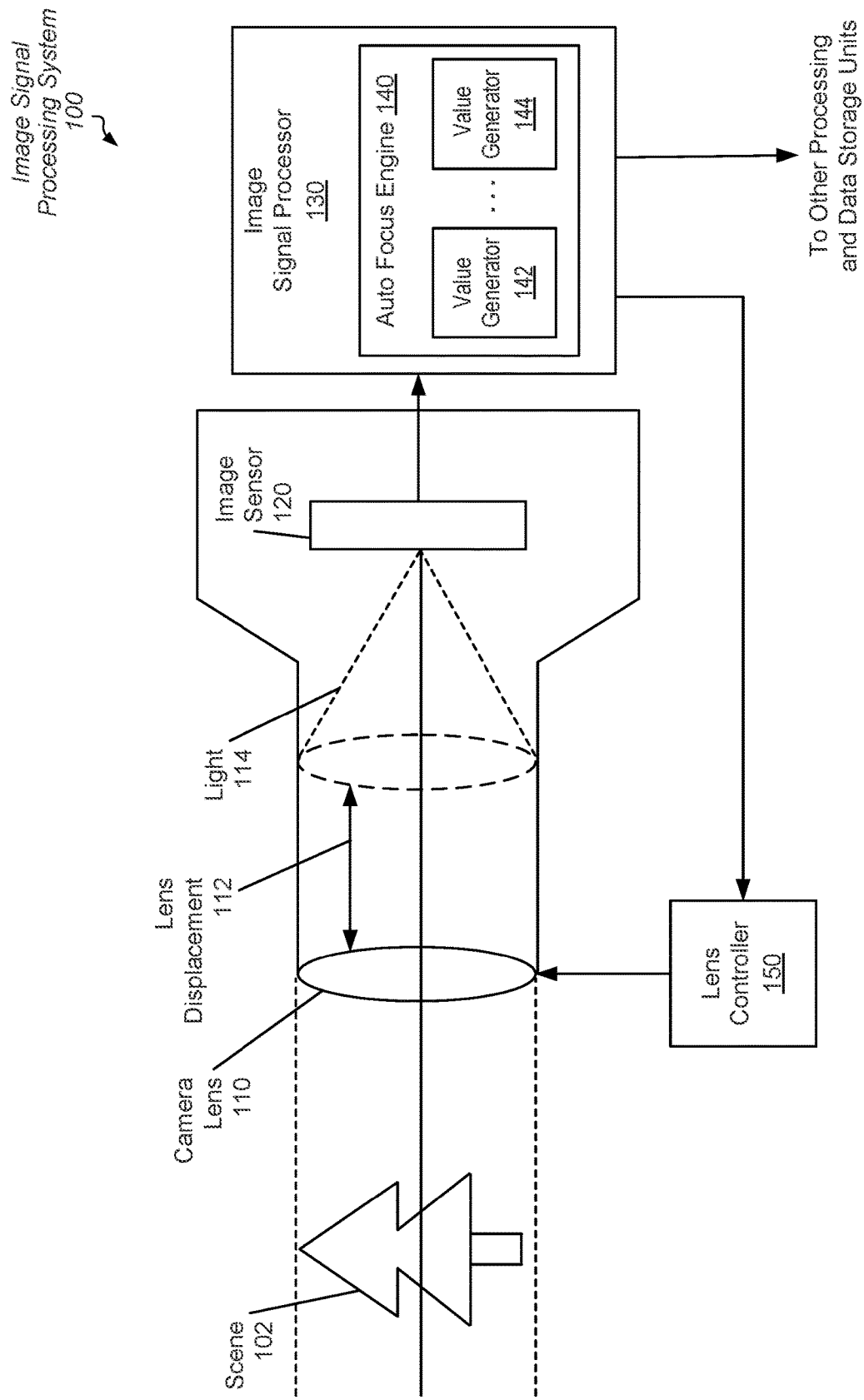
FIG. 1 is a generalized diagram of one embodiment of an image signal processing system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Systems, an apparatus, and methods for efficiently determining a final camera lens position that captures a focused input image are contemplated. In various embodiments, an image signal processing system of a camera includes a camera lens, an image sensor, an auto focus engine, and a lens controller. The image sensor captures optical images of a scene, and converts the optical signals into electrical signals. One or more of the auto focus engine and an image signal processor converts the analog electrical signals into digital signals. Rather than generate a single auto focus value based on the digital signals of the single image, the auto focus engine generates multiple auto focus values based on the digital signals of the single image. Similarly, the auto focus engine uses two or more auto focus value generators to generate the auto focus values, rather than using a single auto focus value generator. As used herein, an "auto focus engine" is also referred to as a "focus engine," an "auto focus value" is also referred to as a "focus value," and an "auto focus value generator" is also referred to as a "focus value generator" or a "value generator." Additionally, a "focus value" is also referred to as a "contrast value" or a "sharpness value."

Based on the focus values, the focus engine determines a next lens position for the camera lens, and sends an indication of this next lens position to the lens controller. The lens controller updates the lens position of the camera lens. This update changes the lens displacement between the camera lens and the image sensor. Accordingly, the discernibility of the objects in the scene as captured in the next optical image changes. These steps repeat until the focus engine determines a final lens position has been found.

The focus engine uses at least two value generators, rather than a single value generator. For example, the focus engine uses at least a first value generator and a second value generator. In various embodiments, each of the first value generator and the second value generator is one of a variety of bandpass filters. In some embodiments, the first value generator is a first bandpass filter with a first bandwidth. The second value generator is a second bandpass filter with a second bandwidth different from the first bandwidth. In some embodiments, the focus values, or contrast values, are generated by the bandpass filters of the focus engine. The bandpass filters receive the digital signals corresponding to the captured image data, and generate output values. In an embodiment, the contrast values are absolute values of the output values of the bandpass filters. In other embodiments, one or more of a variety of equations and relations known to those skilled in the art are used to determine the contrast values from the outputs of the bandpass filters.

The focus engine uses the contrast values from at least two value generators, rather than from a single value generator, to determine multiple factors. A first factor is a search direction for finding the final lens position of the camera lens. A second factor is when to use relatively large or coarse step sizes for updating the lens position. A third factor is when to use relatively small or fine step sizes for updating the lens position.

Turning to FIG. 1, a generalized diagram of one embodiment of an image signal processing system 100 is shown. As shown, the image signal processing system 100 of a camera capable of performing automatic focus includes a camera lens 110, an image sensor 120, an auto focus engine 140, and a lens controller 150. In some embodiments, the auto focus engine 140 (or focus engine 140) is incorporated within an image signal processor 130. In other embodiments, the focus engine 140 and the image signal processor 130 are separate components that communicate with one another.

The image sensor 120 captures optical signals, such as light 114 (or light waves), that pass through the camera lens 110. For example, the optical signals corresponding to the scene 102 are captured by the camera lens 110 and transmitted to the image sensor 120. The optical signals are light waves that reflected off of one or more objects in the scene 102. The lens displacement 112 is the distance between the camera lens 110 and the image sensor 120. The lens controller 150 adjusts the lens position of the camera lens 110, which adjusts the lens displacement 112. The focus engine 140 sends an indication to the lens controller 150 specifying a next lens position for the camera lens. The focus engine 140 determines the next lens position based on processing digital signals corresponding to a captured image of the scene 102 while the camera lens 110 is at a current lens position.

In some embodiments, the image sensor 120 is a charge-coupled device (CCD) based on metal oxide semiconductor (MOS) capacitors. In other embodiments, the image sensor 120 is a CMOS sensor (complementary metal oxide semiconductor sensor) based on active transistors such as MOS field effect transistors (FETs). The image sensor 120 converts the optical signals into analog electrical signals. One or more of the focus engine 140 and the image signal processor 130 converts the analog electrical signals into digital electrical signals. For example, an analog-to-digital converter (ADC) converts the analog electrical signals into digital electrical signals. In some embodiments, the lens controller 150 is a VCM (Voice Coil Motor) actuator that controls the lens position of the camera lens 110 via a spring mechanism.

The focus engine 140 calculates focus values based on the digital electrical signals (or digital signals). The focus values are based on pixel intensity values of the digital signals. To determine whether a captured image is in focus, or has high contrast, the focus engine 140 calculates differences between pixel intensity values of adjacent pixels. When one or more objects of the scene 102 are out of focus and appear blurry to the user when the corresponding digital image data is sent to a display (not shown), the corresponding pixel intensity values of objects in the captured image corresponding to the scene 102 have similar values. The focus engine 140 determines how to adjust the lens displacement 112 in order to cause the one or more objects of the scene 102 to be in focus and appear sharp to the user when the corresponding digital image data is sent to the display. In such a case, the corresponding pixel intensity values of objects in the captured image have maximum or near-maximum differences.

The focus engine 140 is capable of generating a focus value (or contrast value) that indicates the multiple differences between the multiple pixel intensity values across the captured image corresponding to a particular value of the lens displacement 112. For example, the focus engine 140 includes a value generator 142 that generates, or otherwise calculates, the contrast value. In various embodiments, the value generator 142 is one of a variety of filters such as an infinite input response (IIR) filter, a finite impulse response (FIR) filter, a Gaussian filter, a Laplacian filter, and so forth. These various filters are capable of being configured to operate as a bandpass filter or a high pass filter. As the contrast value from the value generator 142 increases, the differences in pixel intensity values of adjacent pixels increase, and the objects in the captured image are more easily discernible when the digital data is rendered and presented on the display for viewing.

Rather than generate a single contrast value based on the digital signals of the captured image, the focus engine 140 generates multiple contrast values based on the digital signals of the captured image. For example, the focus engine 140 uses two or more value generators to generate multiple contrast values. As shown, the focus engine 140 includes the additional value generator 144. Although two value generators 142 and 144 are shown, in other embodiments, the focus engine 140 includes another number greater than one of value generators.

In various embodiments, the value generator 142 is a first filter with a first bandwidth, and the value generator 144 is a second filter with a second bandwidth different from the first bandwidth. In some embodiments, each of the value generator 142 and the value generator 144 is a bandpass filter. For example, the value generator 142 is a first bandpass filter with a first bandwidth and the value generator 144 is a second bandpass filter with a second bandwidth different from the first bandwidth. In this implementation, the first bandwidth and the second bandwidth are defined by the frequency response curves of the first bandpass filter and the second bandpass filter, respectively. For example, the first bandwidth identifies the signals with frequencies that the first bandpass filter passes, or otherwise, does not reject or attenuate. These signals that the first bandpass filter passes have frequencies between a low cutoff frequency, which is the lowest frequency that the first bandpass filter passes signals, and a high cutoff frequency, which is the highest frequency that the first bandpass filter passes signals.

Signals with frequencies below the low cutoff frequency and signals with frequencies above the high cutoff frequency are attenuated by the first bandpass filter. Therefore, the first bandwidth is measured between the low cutoff frequency and the high cutoff frequency of the first bandpass filter. Similarly, the second bandwidth identifies the signals with frequencies that the second bandpass filter passes, or otherwise, does not reject or attenuate. Additionally, the first bandwidth and the second bandwidth do not overlap one another. For example, the low cutoff frequency of the first bandpass filter is less than a low cutoff frequency of the second bandpass filter. Further, the high cutoff frequency of the first bandpass filter is less than the high cutoff frequency of the second bandpass filter. Further still, the high cutoff frequency of the first bandpass filter is less than the low cutoff frequency of the second bandpass filter.

As described earlier, in various embodiments, the value generator 142 is a first filter with a first bandwidth, and the value generator 144 is a second filter with a second bandwidth different from the first bandwidth. In some embodiments, the value generator 142 is a bandpass filter and the value generator 144 is a high pass filter. The high pass filter passes signals with frequencies greater than a single cutoff frequency and rejects (or attenuates) signals with frequencies less than this single cutoff frequency. In various embodiments, each of the low cutoff frequency and the high cutoff frequency of the bandpass filter is less than the single cutoff frequency of the high pass filter. In various embodiments, to operate as a bandpass filter or a high pass filter, each of the value generator 142 and the value generator 144 is configured as one of a variety of filters such as an infinite input response (IIR) filter, a finite impulse response (FIR) filter, a Gaussian filter, a Laplacian filter, and so forth.

When the value generator 142 and the value generator 144 are implemented as bandpass filters, the two bandpass filters receive the digital signals corresponding to the captured image, and generate output values. In an embodiment, the corresponding two contrast values are absolute values of the output values generated by the two bandpass filters. In other embodiments, one or more of a variety of equations and relations known to those skilled in the art are used to determine the two contrast values from the outputs of the two bandpass filters used to implement the value generators 142 and 144. The focus engine 140 uses the two contrast values from the two value generators 142 and 144, rather than a single contrast value from a single value generator, to determine multiple factors. A first factor is a search direction for finding the final lens position of the camera lens. A second factor is when to use relatively large or coarse step sizes for updating the lens position. A third factor is when to use relatively small or fine step sizes for updating the lens position.

In an embodiment, the functionality of the image signal processor 130 is performed by a single processor, whereas, in another embodiment, the functionality of the image signal processor 130 is performed by multiple processors. The functionality of the image signal processor 130 is representative of the functionality of one or more of a general-purpose central processing unit (CPU), a processor with a parallel data microarchitecture such as a graphics processing unit (GPU), or a digital signal processor (DSP), an application specific integrated circuit (ASIC), or other.

The image signal processor 130 sends control signals and data to one or more external components. The external components include other components of the camera and peripheral devices. These external components are capable of compressing the digital data, editing the digital data, and storing the digital data. Prior to performing these operations, the image signal processing system 100 of the camera attempts to capture a high contrast image for the user. It is noted that the above subcomponent focus engine 140 is implemented with hardware, such as circuitry, to perform the above steps to select lens positions for the camera lens 110.

Figure 2:
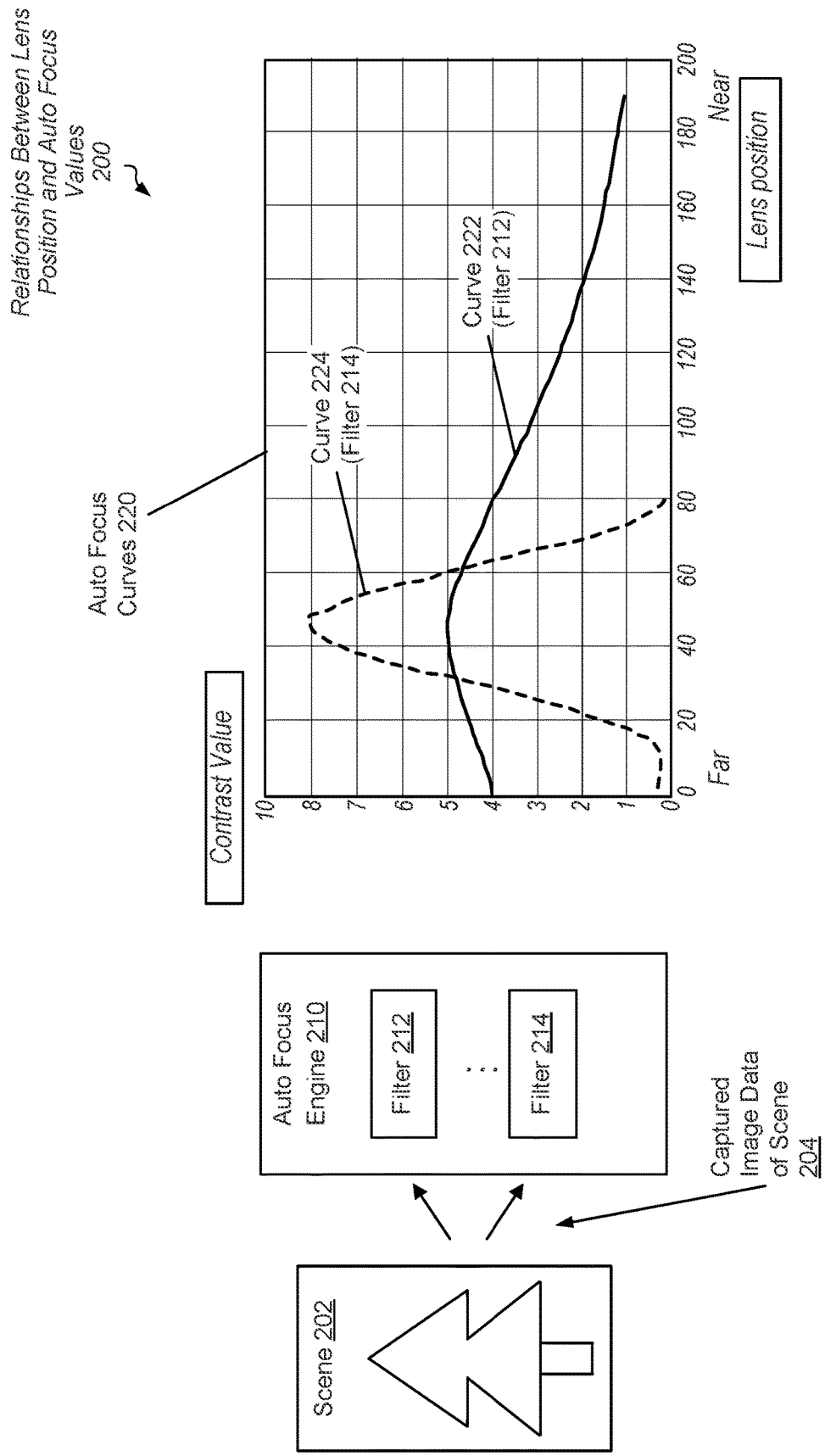
FIG. 2 is a generalized diagram of one embodiment of relationships between lens position and auto focus values.

Referring to FIG. 2, a generalized diagram of relationships 200 between lens position and focus values is shown. As described earlier, light waves reflected from objects in the scene 202 are captured and converted to digital electrical signals 204, which are input to one or more value generators such as bandpass filters 212 and 214 of the auto focus engine 210. Although two bandpass filters 212 and 214 (or filters 212 and 214) are shown, in other embodiments, the auto focus engine 210 (or focus engine 210) includes another number of filters greater than one.

In various embodiments, the bandpass filters 212 and 214 (or filters 212 and 214) have different bandwidths. In various embodiments, the low cutoff frequency of the filter 212 is less than a low cutoff frequency of the filter 214. Further, the high cutoff frequency of the filter 212 is less than the high cutoff frequency of the filter 214. Further still, the high cutoff frequency of the filter 212 is less than the low cutoff frequency of the filter 214.

As shown, the auto focus curves 220 (or focus curves 220) illustrate a relationship between lens position of a camera lens and contrast values of a captured image calculated at the lens positions. In the illustrated embodiment, auto focus curve 222 (or focus curve 222) indicates calculated contrast values of a captured image calculated with filter 212 at different lens positions. The y-axis includes the contrast values and the x-axis includes the lens positions. The left side of the x-axis corresponds to a lens position used to increase contrast of an object in a scene located at a very far or infinite distance from the camera. The right side of the x-axis corresponds to a lens position used to increase contrast of an object in a scene located at a very near or closest distance from the camera.

Focus curve 224 indicates calculated contrast values of the captured image calculated with filter 214 at different lens positions. As can be seen from the focus curves 220, below the two intersections of the focus curves 222 and 224 (near the contrast value of 5), a width of the focus curve 224 generated by the filter 214 is smaller than a width of the focus curve 222 generated by the filter 212. Additionally, below the two intersections of the focus curves 222 and 224 (near the contrast value of 5 on the y-axis), the focus curve 224 generated by the filter 214 is comprised within the focus curve 222 generated by the filter 212. The focus curve 222 generated by filter 212 has a first peak (at contrast value 5 on the y-axis) less than a second peak of the focus curve 224 generated by the filter 214 (at contrast value 8 on the y-axis).

Figure 3:
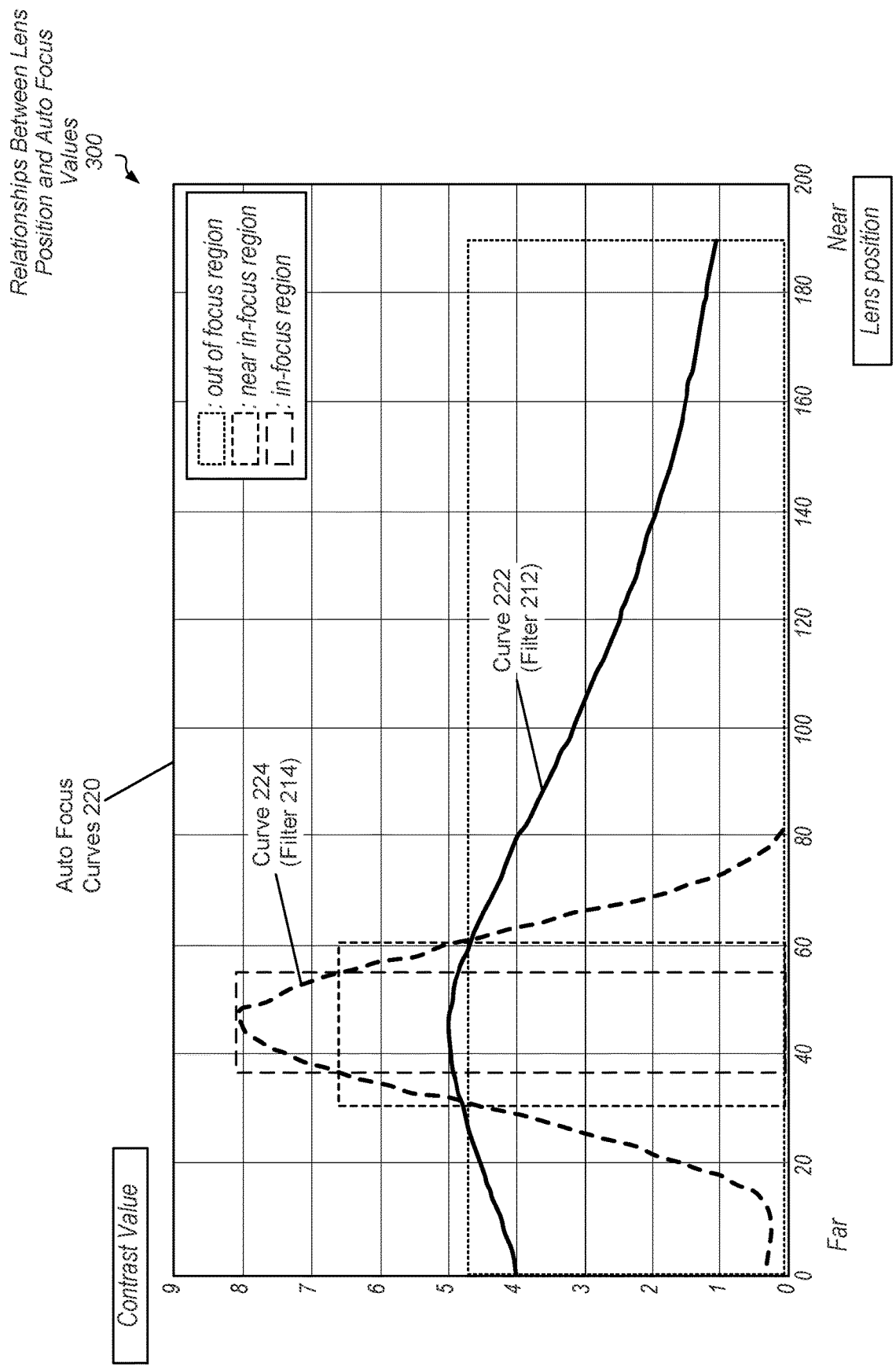
FIG. 3 is a generalized diagram of one embodiment of relationships between lens position and auto focus values.

Turning to FIG. 3, a generalized diagram of relationships 300 between lens position and focus values is shown. Focus curves described earlier are numbered identically. As shown, three regions accompany the focus curves 222 and 224. An in-focus region is the narrowest of the three regions, which also coincides with the peaks of the focus curves 222 and 224. The near in-focus region also coincides with the peaks of the focus curves 222 and 224, but it is wider than the in-focus region. The out of focus region is the widest region and does not coincide with the peaks of the focus curves 222 and 224.

The search for a highest contrast value will yield a final lens position near the value of 50 on the x-axis. It is noted that when a selected lens position is associated with a contrast value in the out of focus region, it is best to use relatively large or coarse step sizes when searching for the final lens position. When a selected lens position is associated with a contrast value in the near in-focus region or in-focus region, it is best to use relatively small or fine step sizes when searching for the final lens position.

Figure 4:
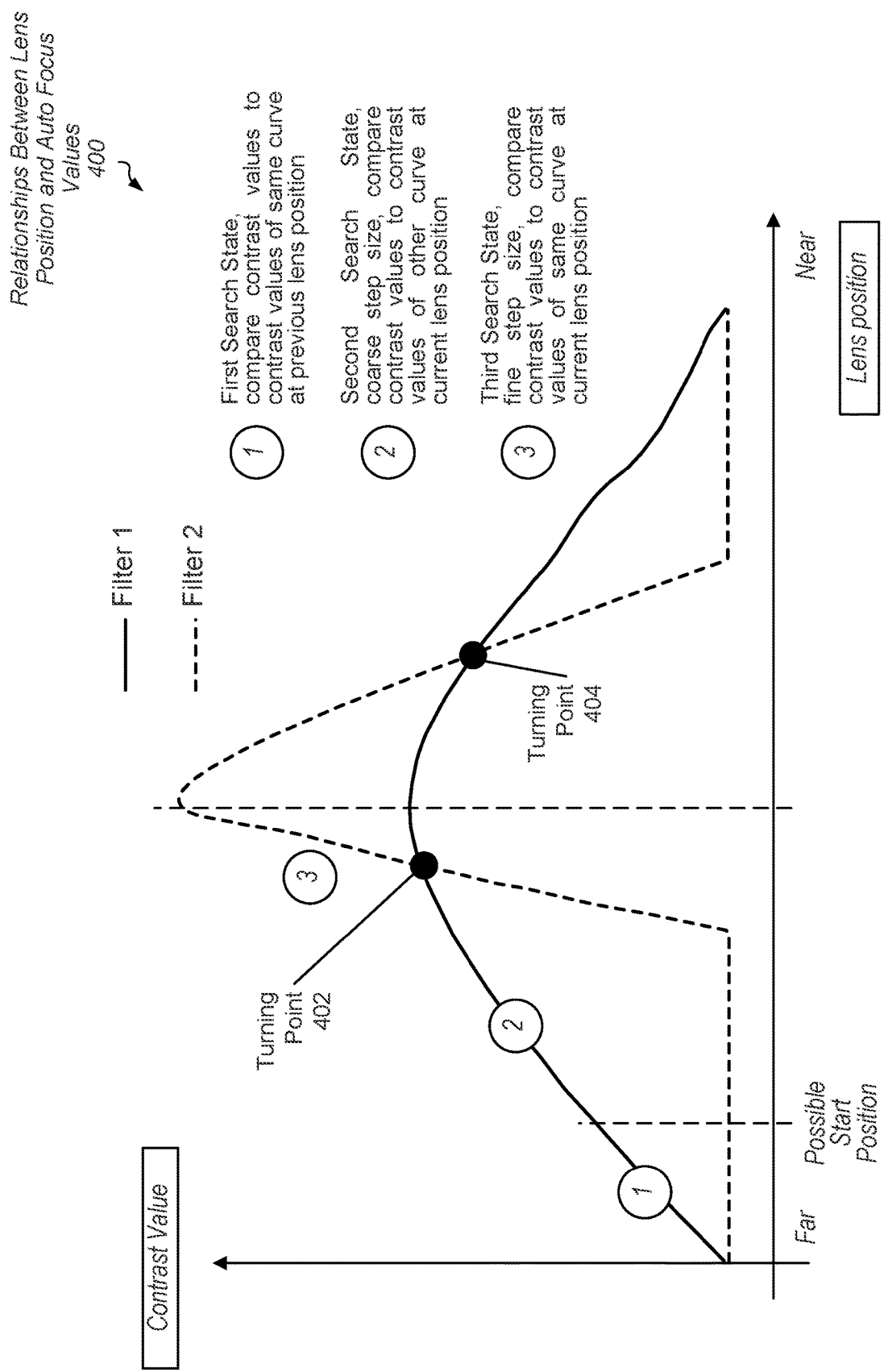
FIG. 4 is a generalized diagram of one embodiment of relationships between lens position and auto focus values.

Referring now to FIG. 4, a generalized diagram of relationships 400 between lens position and focus values is shown. The focus curve with the dashed line corresponds to Filter 1 and the focus curve with the solid line corresponds to Filter 2. In various embodiments, Filter 1 and Filter 2 are bandpass filters with different bandwidths from one another. Filter 1 has frequency response characteristics of filter 212 (of FIG. 2) and Filter 2 has frequency response characteristics of filter 214 (of FIG. 2), which were described earlier. As shown, below the two intersections of the focus curves (at turning points 402 and 404), a width of the focus curve generated by Filter 2 is smaller than a width of the focus curve generated by Filter 1. Additionally, below the two intersections of the focus curves (at turning points 402 and 404), the width of the focus curve generated by Filter 2 is comprised within the width of the focus curve generated by the Filter 1.

A possible start lens position and three search states are also shown. Although a particular start lens position is shown beginning near the far left side of the x-axis, it is possible for any location on the x-axis to be the start position for searching for the final lens position. The first search state indicated by the circled label 1 is the search state when a focus engine determines the search direction is moving left on the x-axis or moving right on the x-axis from the start position. The focus engine determines the search direction for moving the camera lens based on comparing contrast values of a same focus curve (generated by a same filter) at two different lens positions. The comparison results indicate whether the slope of the focus curves between the two lens positions is increasing or decreasing. The slope, or a ratio, is a first difference of two contrast values divided by a second difference of two lens positions that include a most recent (second) lens position and an immediately previous (initial) lens position. If the slope is increasing, then the search direction is moving to the right on the x-axis to reach the peak of the focus curves. If the slope is decreasing, then the search direction is moving to the left on the x-axis to reach the peak of the focus curves.

The second search state indicated by the circled label 2 is the search state when the focus region selects relatively large or coarse step sizes when updating the lens position of the camera lens. The focus engine compares the contrast values of the two filters against one another. For example, the focus engine determines a difference between the two contrast values at a given lens position. If the difference is less than a threshold, then the focus engine found the turning point 402. It is noted that if the start position was located on the far right of the x-axis, the turning point would be the intersection of the two focus curves that occurs to at the location labeled turning point 404.

After the turning point 402 is found, the third search state indicated by the circled label 3 is the search state when the focus region selects relatively small or fine step sizes when updating the lens position of the camera lens. In some embodiments, the focus engine selects only one of the two filters to generate contrast values in the third search state. For example, in one implementation, the focus engine selects contrast values from only Filter 2 in the third search state, since the slope of the corresponding focus curve is steep, which reduces the chance of failing to detect overshooting a maximum contrast value at the peak of the focus curve.

Figure 5:
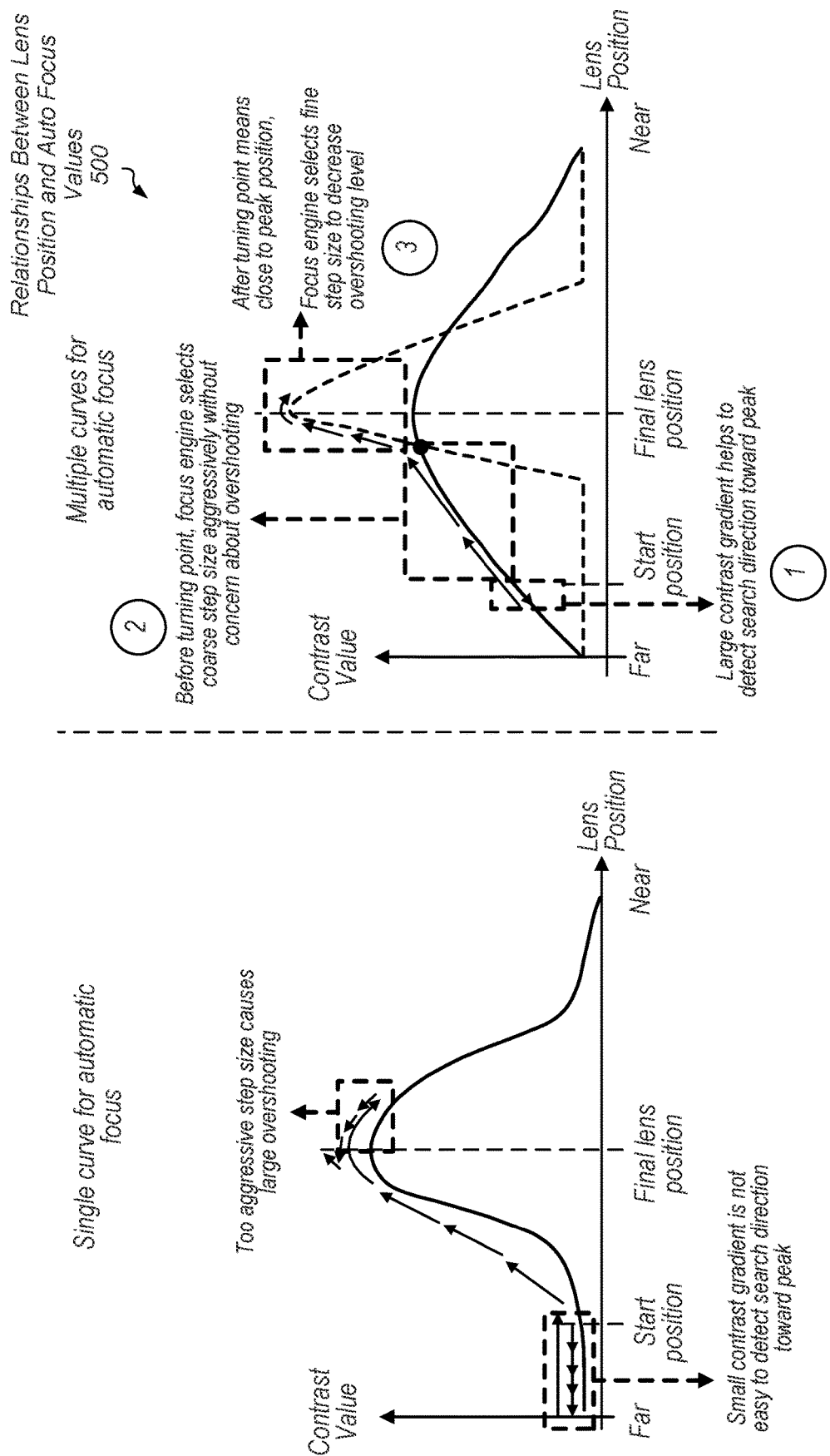
FIG. 5 is a generalized diagram of one embodiment of relationships between lens position and auto focus values.

Turning to FIG. 5, a generalized diagram of relationships 500 between lens position and focus values is shown. The left side of the diagram illustrates a search using a single focus curve for performing automatic focus. The right side of the diagram illustrates a search using multiple focus curves for performing automatic focus. On the right side, the three search states described earlier are numbered identically in the circled labels. The turning point is indicated by the dot at the intersection of the two focus curves. Selecting the search direction toward the peak of the focus curve(s) and moving toward the peak is more efficient when using multiple focus curves. Further details about the steps performed during the three search states are described in the following discussion.

Figure 6:
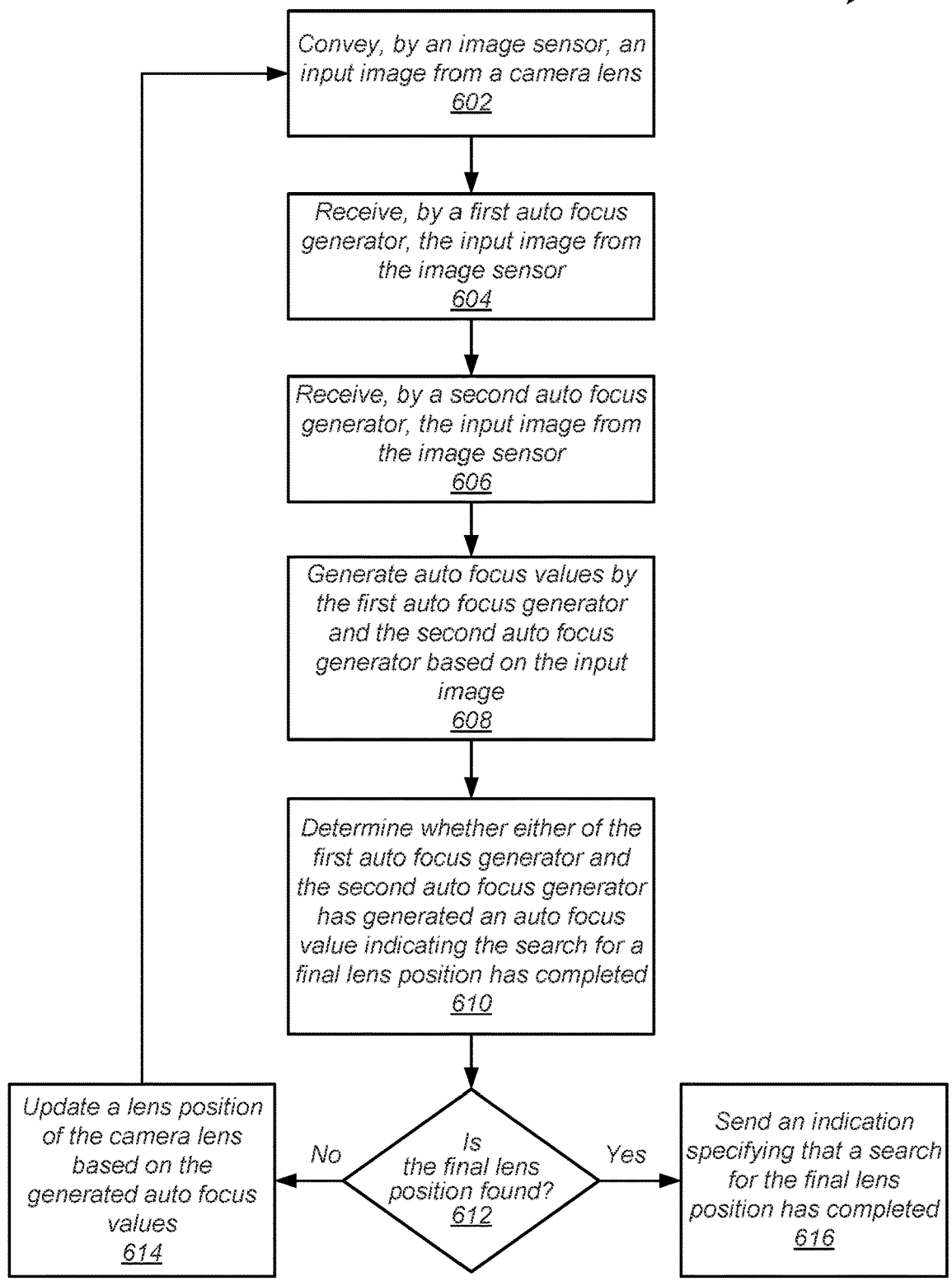
FIG. 6 is a generalized diagram of one embodiment of a method for efficiently determining a final camera lens position that captures a focused input image.

Referring now to FIG. 6, one embodiment of a method 600 for efficiently determining a final camera lens position that captures a focused input image is shown. For purposes of discussion, the steps in this embodiment (as well as in FIGS. 7-10) are shown in sequential order. However, in other embodiments some steps occur in a different order than shown, some steps are performed concurrently, some steps are combined with other steps, and some steps are absent. An image sensor conveys an input image from a camera lens (block 602). Each of the image sensor and the camera lens is used within a still camera or a video camera capable of capturing optical data. One or more components of the camera are capable of converting the optical data to digital electrical signals. A first value generator receives digital data corresponding to the input image from the image sensor (block 604). A second value generator also receives the digital data of the input image (block 606). In various embodiments, each of the first value generator and the second value generator is one of a variety of bandpass filters. In some embodiments, the first value generator is a bandpass filter with a first bandwidth different from a second bandwidth of the second value generator.

The first value generator and the second value generator generate focus values based on the input image (block 608). In various implementations, the focus values are contrast values. In an embodiment, due to their different bandwidths, the first value generator and the second value generator are capable of generating auto focus curves that are different from one another. A first auto focus curve illustrates a relationship between the focus values generated by the first value generator and a lens position of the camera lens. A second auto focus curve illustrates a relationship between the focus values generated by the second value generator and the lens position of the camera lens. In an implementation, a width of the second auto focus curve generated by the second value generator is smaller than a width of the first auto focus curve generated by the first value generator. In some implementations, the width of the second auto focus curve is comprised within the width of the first auto focus curve.

A focus engine determines whether either of the first value generator and the second value generator has generated a focus value indicating the search for a final lens position has completed (block 610). In some implementations, the search has ended when the focus engine determines a most recent focus value is less than an immediately previous focus value, which indicates the peak of the focus curve has been passed. In such a case, the lens position corresponding to the immediately previous focus value is the final lens position. In other implementations, upon determining the most recent focus value is less than the immediately previous focus value, one more step is performed, but with by reversing the search direction and reducing the step size further. For example, if the search direction was going to the right toward a scene located very near the camera, the second filter selects a lens position to the left and reduces the step size to a finer step size. If the search direction was going to the left toward a scene located very far from the camera, the second filter selects a lens position to the right left and reduces the step size to a finer step size. In this case, the next lens position is the final lens position. In other cases, multiple additional steps with the reduced step size are performed until again a most recent focus value is less than an immediately previous focus value. When the focus engine determines the search has ended, the final lens position is a lens position corresponding to a maximum focus value generated by a particular one of the first value generator and the second value generator. In some embodiments, the focus engine selects the second value generator as the particular one due to the steeper auto focus curves generated by the second value generator.

If the final lens position is not yet found ("no" branch of the conditional block 612), then a lens controller updates a lens position of the camera lens based on the current, generated focus values. The focus engine sends an indication to the lens controller indicating a next lens position. Afterward, control flow of method 600 returns to block 602 where the image sensor conveys an input image from the camera lens at its new position. If the final lens position is found ("yes" branch of the conditional block 612), then the focus engine sends an indication specifying that a search for the final lens position has completed (block 616). In some embodiments, the focus engine sends this indication to an image signal processor.

Figure 7:
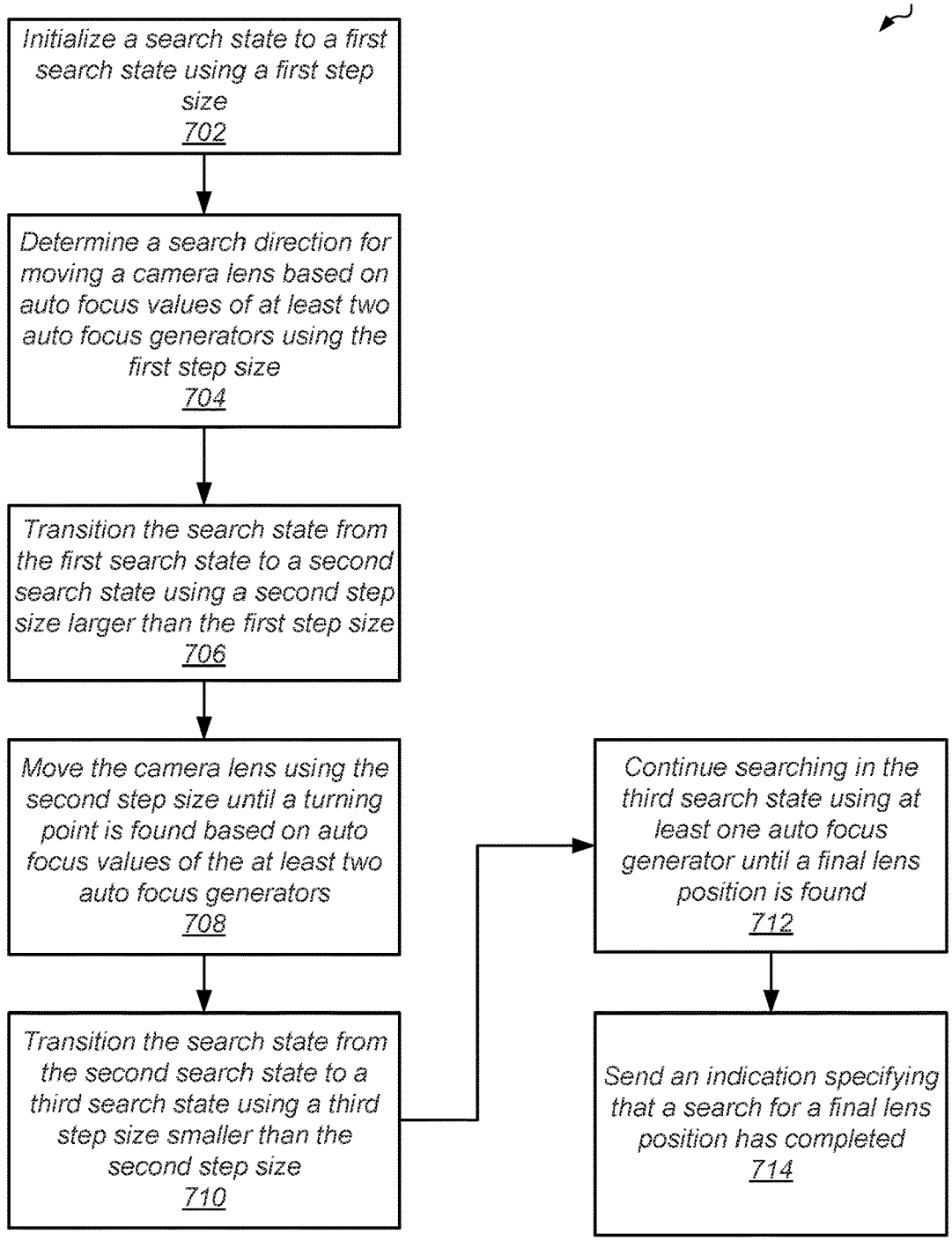
FIG. 7 is a generalized diagram of one embodiment of a method for efficiently determining a final camera lens position that captures a focused input image.

Referring now to FIG. 7, one embodiment of a method 700 for efficiently determining a final camera lens position that captures a focused input image is shown. A focus engine initializes a search state to a first search state using a first step size (block 702). The focus engine determines a search direction for moving a camera lens based on focus values of at least two value generators using the first step size (block 704). In various embodiments, the value generators are bandpass filters with different bandwidths. The focus engine transitions the search state from the first search state to a second search state using a second step size larger than the first step size (block 706). The larger second step size is a relatively coarse step size used to update lens positions of the camera lens. The focus engine sends one or more indications to a lens controller to move the camera lens using the second step size until a turning point is found based on focus values of the at least two value generators (block 708). The one or more indications include new lens positions used by the lens controller to move the camera lens.

At the turning point, the focus engine transitions the search state from the second search state to a third search state using a third step size smaller than the second step size (block 710). The smaller third step size is a relatively fine step size used to update lens positions of the camera lens. The focus engine continues searching in the third search state using at least one value generator until a final lens position is found (block 712). As described earlier, in some implementations, the search has ended when the focus engine determines a most recent focus value indicates the search direction has changed from an initial search direction. The focus engine sends an indication specifying that a search for a final lens position is found (block 714). In various embodiments, the focus engine sends this indication to an image signal processor.

Figure 8:
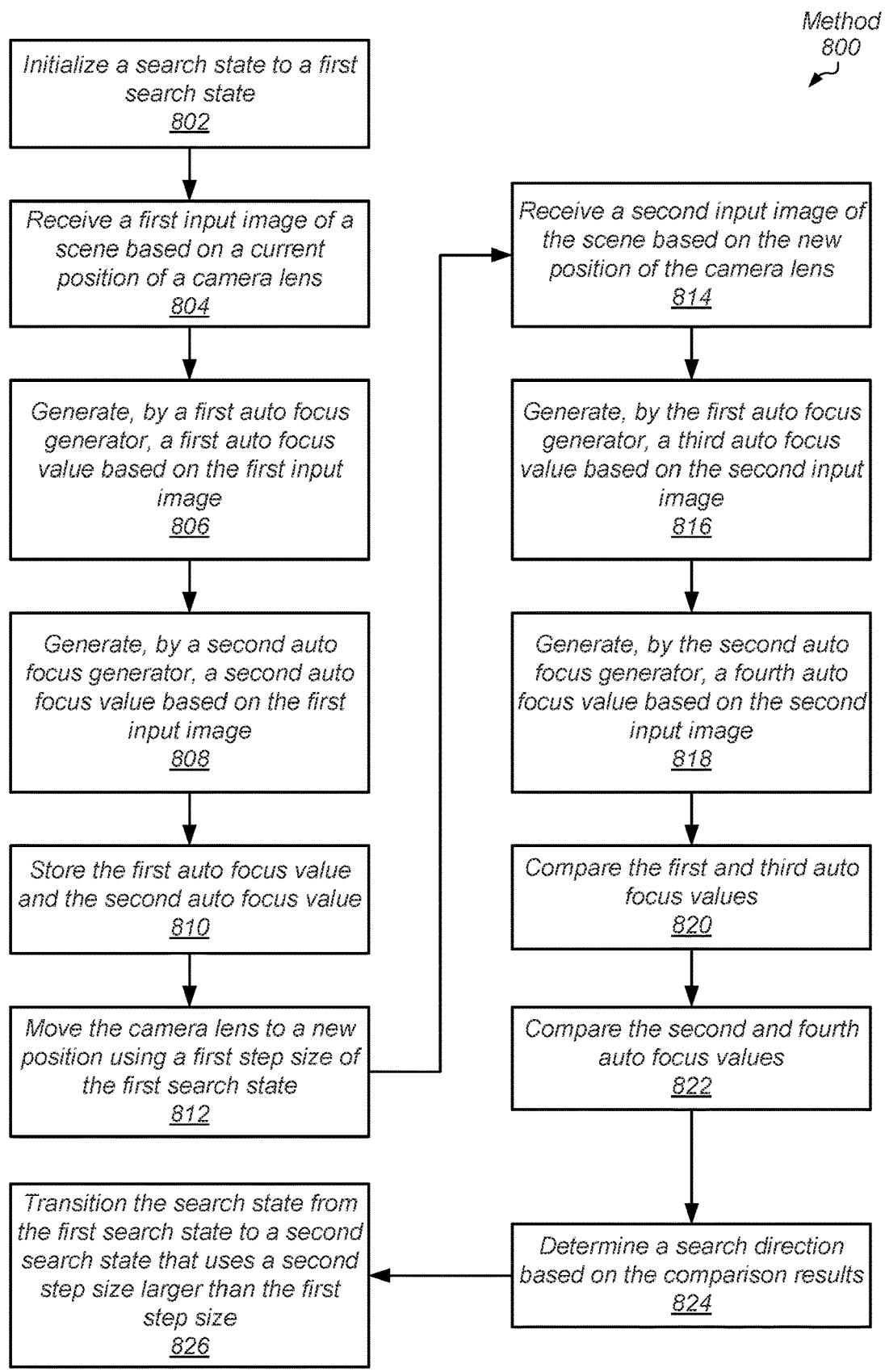
FIG. 8 is a generalized diagram of one embodiment of a method for efficiently determining a search direction for finding a final camera lens position that captures a focused input image.

Referring now to FIG. 8, one embodiment of a method 800 for efficiently determining a search direction for finding a final camera lens position that captures a focused input image is shown. A focus engine initializes a search state to a first search state (block 802). The focus engine receives a first input image of a scene based on a current position of a camera lens (block 804). In some embodiments, the focus engine uses at least two value generators. In various embodiments, the value generators are bandpass filters with different bandwidths. A first value generator generates a first focus value based on the first input image (block 806). In various implementations, the focus values are contrast values. A second value generator generates a second focus value based on the first input image (block 808).

The focus engine stores the first focus value and the second focus value (block 810). The focus engine sends an indication to a lens controller to move the camera lens to a new position using a first step size of the first search state (block 812). The focus engine has not yet determined a search direction to use for finding a final lens position of the camera lens. The focus engine uses at least two focus values from the second value generator to determine the search direction. For example, due to their different bandwidths, the first value generator and the second value generator are capable of generating auto focus curves that are different from one another. A first auto focus curve illustrates a relationship between the focus values generated by the first value generator and a lens position of the camera lens. A second auto focus curve illustrates a relationship between the focus values generated by the second value generator and the lens position of the camera lens. In an implementation, a width of the second auto focus curve generated by the second value generator is smaller than a width of the first auto focus curve generated by the first value generator. In some implementations, the width of the second auto focus curve is comprised within the width of the first auto focus curve.

The focus engine receives a second input image of the scene based on the new position of the camera lens (block 814). The first value generator generates a third focus value based on the second input image (block 816). The second value generator generates a fourth focus value based on the second input image (block 818). The focus engine compares the first and third focus values (block 820), and the focus engine compares the second and fourth focus values (block 822). For example, if the third focus value is greater than the first focus value, then the camera lens is moving from a lens position indicating a far distance between the scene and the camera to a lens position indicating a near distance between the scene and the camera lens. In other words, the focus engine is traversing an increasing slope of the first auto focus curve. In contrast, if the third focus value is less than the first focus value, then the camera lens is moving in the opposite direction and the focus engine is traversing a decreasing slope of the first auto focus curve. Similar results are found with comparisons of the second and fourth focus values. Therefore, the focus engine determines the search direction based on the comparison results (block 824). Following, the focus engine transitions the search state from the first search state to a second search state using a second step size larger than the first step size (block 826). In other words, the focus engine transitions to a search with relatively coarse steps sizes used for updating the lens position after the search direction is found.

Figure 9:
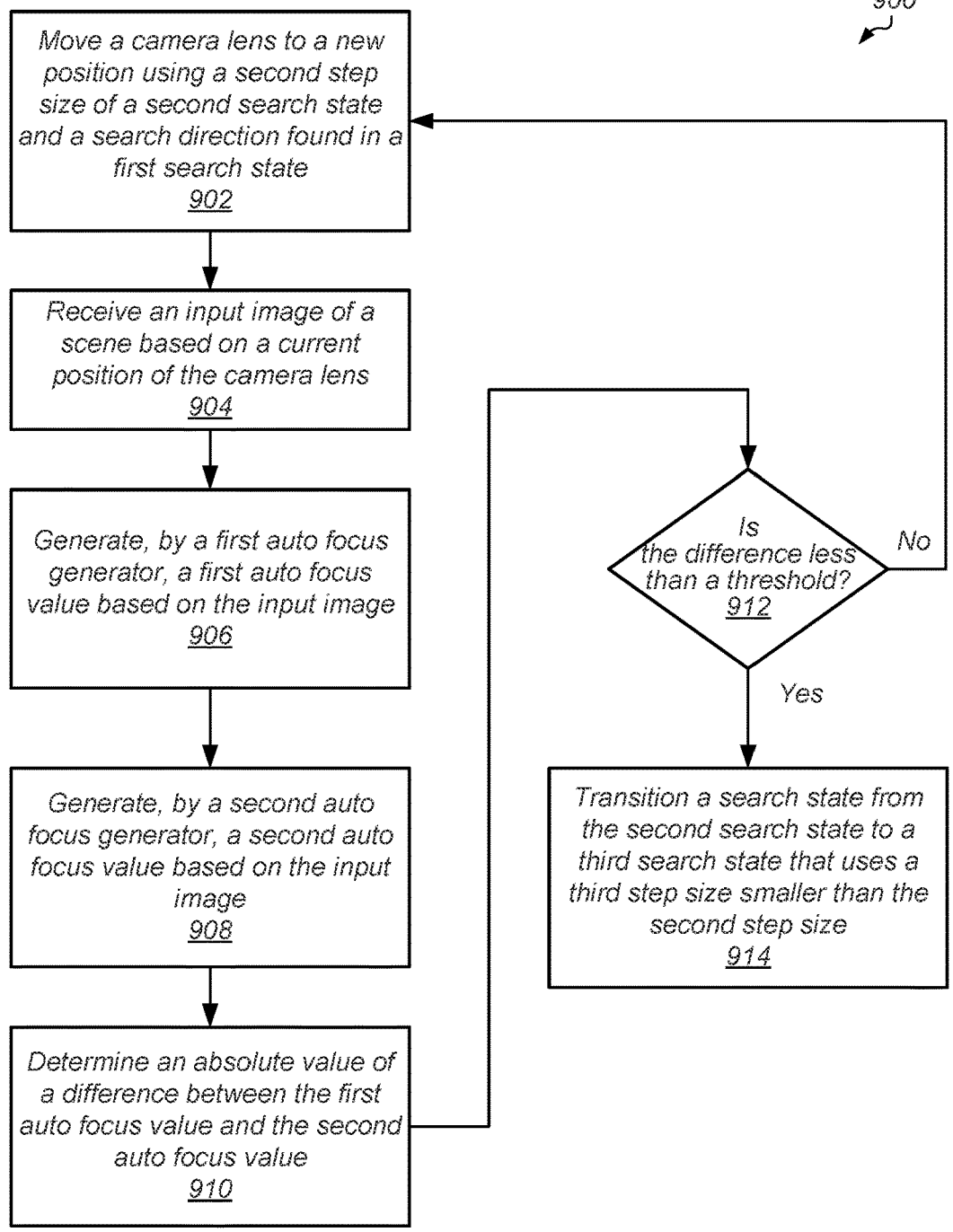
FIG. 9 is a generalized diagram of one embodiment of a method for efficiently searching for a final camera lens position that captures a focused input image using coarse step sizes.

Turning to FIG. 9, one embodiment of a method 900 for efficiently searching for a final camera lens position that captures a focused input image using coarse step sizes is shown. A lens controller moves a camera lens to a new position using a second step size of a second search state and a search direction found in a first search state (block 902). Based on a current position of the camera lens, a focus engine receives an input image of a scene from an image sensor (block 904). A first value generator of the focus engine generates a first focus value based on the first input image (block 906). In various implementations, the focus values are contrast values. A second value generator of the focus engine generates a second focus value based on the first input image (block 908).

The focus engine determines an absolute value of a difference between the first focus value and the second focus value (block 910). If the difference is not less than a threshold ("no" branch of the conditional block 912), then control flow of method 900 returns to block 902 where the lens controller moves the camera lens to a new position using the second step size of the second search state and the search direction found in the first search state. If the difference is less than a threshold ("yes" branch of the conditional block 912), then the focus engine transitions a search state from the second search state to a third search state that uses a third step size smaller than the second step size (block 914). In other words, the focus engine has determined that a turning point in time has occurred, and the focus engine transitions to a search with relatively fine steps sizes used for updating the lens position based on reaching the turning point in time. The turning point in time indicates a search using relative large or coarse step sizes and output focus values from the first value generator with a relatively wide auto focus curve (and relatively small slopes) has ended. Moving forward, the focus engine is able to continue a search using relative small or fine step sizes and output focus values from the second value generator with a relatively narrow auto focus curve (and relatively steep slopes).

Figure 10:
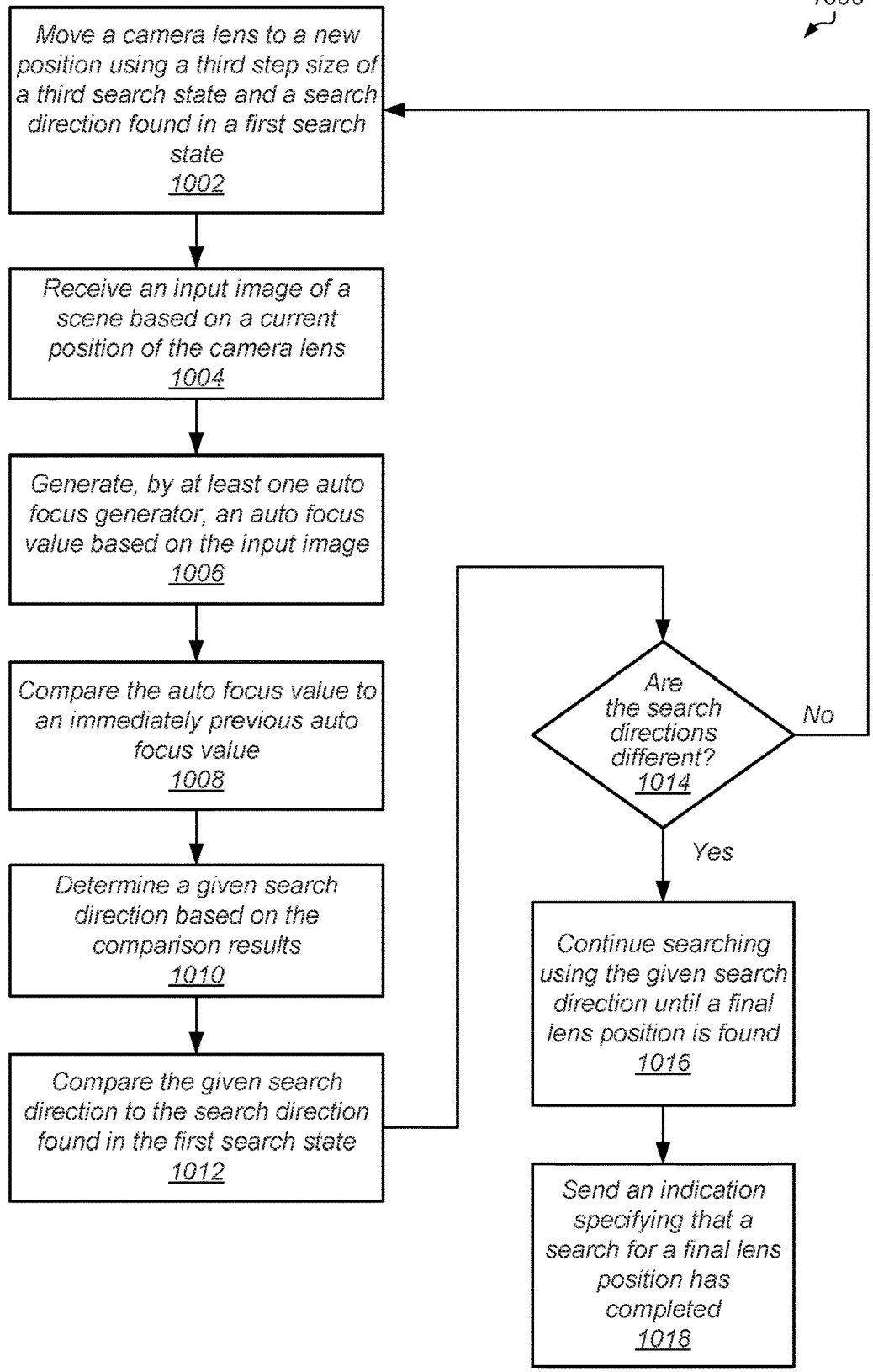
FIG. 10 is a generalized diagram of one embodiment of a method for efficiently searching for a final camera lens position that captures a focused input image using fine step sizes.

Referring now to FIG. 10, one embodiment of a method 1000 for efficiently searching for a final camera lens position that captures a focused input image using fine step sizes is shown. A lens controller moves a camera lens to a new position using a third step size of a third search state and a search direction found in a first search state (block 1002). Based on a current position of the camera lens, a focus engine receives an input image of a scene from an image sensor (block 1004). A first value generator of the focus engine generates a first focus value based on the first input image (block 1006). In various implementations, the focus values are contrast values. In some embodiments, although the focus engine has multiple value generators, the focus engine uses output focus values only from a single value generator in the third search state. In an embodiment, the focus engine selects a value generator that provides a steepest auto focus curve.

The focus engine compares the focus value to an immediately previous focus value (block 1008). The focus engine determines a given search direction based on the comparison results (block 1010). The comparison is similar to the comparison steps used in the first search state for determining an initial search direction. The focus engine compares the given search direction to the search direction found in the first search state (block 1012). If the search directions are not different ("no" branch of the conditional block 1014), then control flow of method 1000 returns to block 1002 where the lens controller moves the camera lens to a new position using the third step size of the third search state and the search direction found in the first search state. If the search directions are different ("yes" branch of the conditional block 1014), then the focus engine continues searching using the given search direction until a final lens position is found (block 1016). The focus engine sends an indication specifying that a search for a final lens position has completed (block 1018). For example, the focus engine sends this indication to an image signal processor.

It is noted that one or more of the above-described embodiments include software. In such embodiments, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various embodiments, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. A circuit comprising:
    an interface configured to receive image data based on a lens located at a first lens position;
    a first filter configured to generate a first contrast value based on the image data;

a second filter configured to generate a second contrast value based on the image data; and circuitry configured to:
  determine a second lens position different from the first lens position based on the first contrast value and the second contrast value; and
  select only the second filter of the first filter and the second filter to generate contrast values, in response to a difference between the first contrast value and the second contrast value being less than a first threshold.

2. The circuit as recited in claim 1, wherein the circuitry is further configured determine the second lens position is a first distance from the first lens position, based at least in part on the difference between the first contrast value and the second contrast value being greater than a second threshold.

3. The circuit as recited in claim 2, wherein the circuitry is further configured determine the second lens position is a second distance from the first lens position, different than the first distance, based at least in part on the difference between the first contrast value and the second contrast value being less than the second threshold.

4. The circuit as recited in claim 1, wherein:
the first filter has a first bandwidth; and
the second filter has a second bandwidth different from the first bandwidth.

5. The circuit as recited in claim 4, wherein:
each of the first filter and the second filter is a bandpass filter; and
the first bandwidth and the second bandwidth do not overlap one another.

6. The circuit as recited in claim 5, wherein a high cutoff frequency of the first filter is less than a low cutoff frequency of the second filter.

7. The circuit as recited in claim 1, wherein the circuitry is further configured to determine a final lens position has been found, in response to determining a most recent contrast value is less than an immediately previous contrast value.

8. The circuit as recited in claim 1, wherein during an auto focus operation, the circuitry is further configured to determine a step size for a search direction of the lens based on a difference between a contrast value generated by the first filter and a contrast value generated by the second filter.

9. A method comprising:
receiving, by an interface, image data based on a lens located at a first lens position;
generating, by a first filter, a first contrast value based on the image data;
generating, by a second filter, a second contrast value based on the image data;
determining, by a focus engine, a second lens position different from the first lens position based on the first contrast value and the second contrast value; and
selecting, by the focus engine, only the second filter of the first filter and the second filter to generate contrast values, in response to a difference between the first contrast value and the second contrast value being less than a first threshold.

10. The method as recited in claim 9, further comprising determining the second lens position is a first distance from the first lens position, based at least in part on the difference between the first contrast value and the second contrast value being greater than a second threshold.

11. The method as recited in claim 10, further comprising determining the second lens position is a second distance from the first lens position, different than the first distance, based at least in part on the difference between the first contrast value and the second contrast value being less than the second threshold.

12. The method as recited in claim 9, wherein:
the first filter has a first bandwidth; and
the second filter has a second bandwidth different from the first bandwidth.

13. The method as recited in claim 12, wherein:
each of the first filter and the second filter is a bandpass filter; and
the first bandwidth and the second bandwidth do not overlap one another.

14. The method as recited in claim 9, further comprising determining a final lens position has been found, in response to determining a most recent contrast value is less than an immediately previous contrast value.

15. An apparatus comprising:
an image sensor configured to convey image data based on a lens located at a first lens position;
a lens controller configured to adjust a lens position of the lens; and
a focus engine comprising:
  a first filter configured to generate a first contrast value based on the image data;
  a second filter configured to generate a second contrast value based on the image data; and
  wherein the apparatus is configured to:
    determine a second lens position different from the first lens position based on the first contrast value and the second contrast value; and
    select only the second filter of the first filter and the second filter to generate contrast values, in response to a difference between the first contrast value and the second contrast value being less than a first threshold.

16. The apparatus as recited in claim 15, wherein the apparatus is further configured determine the second lens position is a first distance from the first lens position, based at least in part on the difference between the first contrast value and the second contrast value being greater than a second threshold.

17. The apparatus as recited in claim 16, wherein the apparatus is further configured determine the second lens position is a second distance from the first lens position, different than the first distance, based at least in part on the difference between the first contrast value and the second contrast value being less than the second threshold.

18. The apparatus as recited in claim 17, wherein:
the first filter has a first bandwidth; and
the second filter has a second bandwidth different from the first bandwidth.

19. The apparatus as recited in claim 18, wherein:
each of the first filter and the second filter is a bandpass filter; and
the first bandwidth and the second bandwidth do not overlap one another.

20. The apparatus as recited in claim 15, wherein the apparatus is further configured to determine a final lens position has been found, in response to determining a most recent contrast value is less than an immediately previous contrast value.

* * * * *